United States Patent
Annau et al.

(10) Patent No.: US 7,346,608 B2
(45) Date of Patent: Mar. 18, 2008

(54) METHOD AND APPARATUS FOR QUERY AND ANALYSIS

(75) Inventors: Thomas M. Annau, San Francisco, CA (US); Joseph Sill, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 545 days.

(21) Appl. No.: 10/946,328

(22) Filed: Sep. 20, 2004

(65) Prior Publication Data

US 2005/0097092 A1 May 5, 2005

Related U.S. Application Data

(62) Division of application No. 09/698,873, filed on Oct. 27, 2000, now Pat. No. 6,804,662.

(51) Int. Cl.
*G06F 17/30* (2006.01)
(52) U.S. Cl. .............................. 707/3; 707/2
(58) Field of Classification Search ............. 707/1–10, 707/104.1
See application file for complete search history.

(56) References Cited

U.S. PATENT DOCUMENTS

| | | | |
|---|---|---|---|
| 4,849,898 A | 7/1989 | Adi | |
| 5,056,021 A | 10/1991 | Ausborn | |
| 5,251,316 A | 10/1993 | Anick et al. | |
| 5,297,042 A | 3/1994 | Morita | |
| 5,301,109 A | 4/1994 | Landauer et al. | |
| 5,537,590 A | 7/1996 | Amado | |
| 5,576,954 A | 11/1996 | Driscoll | |
| 5,608,899 A | 3/1997 | Li et al. | |
| 5,642,502 A | 6/1997 | Driscoll | |
| 5,675,788 A | 10/1997 | Husick et al. | |
| 5,675,819 A | 10/1997 | Schuetze | |
| 5,696,964 A | 12/1997 | Cox et al. | |
| 5,713,015 A | 1/1998 | Goel et al. | |
| 5,717,914 A | 2/1998 | Husick et al. | |
| 5,721,929 A | 2/1998 | Pasquariello | |
| 5,826,077 A | 10/1998 | Blakeley | |
| 5,826,261 A | 10/1998 | Spencer | |

(Continued)

FOREIGN PATENT DOCUMENTS

WO  WO 02/35316 A2  5/2002

(Continued)

OTHER PUBLICATIONS

Northern Light Search, http://www.northernlight.com, A Guide to Statistical Software, http://www.galaxy.gm-u,edu/papers.astr1.html.

(Continued)

*Primary Examiner*—Yicun Wu
(74) *Attorney, Agent, or Firm*—SF Bay Area Patents, LLC; Andrew V. Smith (57) ABSTRACT

A data handling method combines search capabilities with analytical functionality. The invention provides advantages when dealing with structured documents (such as electronic catalogs, XML documents, text documents, HTML documents, Internet documents, etc.) and other data stored in a computer system. Various embodiments include simplified ways to express search/analysis requests of a data set and also to express results to such requests.

37 Claims, 4 Drawing Sheets

U.S. PATENT DOCUMENTS

| | | |
|---|---|---|
| 5,878,426 A | 3/1999 | Plasek et al. |
| 5,884,305 A | 3/1999 | Kleinberg et al. |
| 5,893,092 A | 4/1999 | Driscoll |
| 5,893,104 A | 4/1999 | Srinivasan et al. |
| 5,924,090 A | 7/1999 | Krellenstein |
| 5,950,197 A | 9/1999 | Beam |
| 5,960,411 A | 9/1999 | Hartman et al. |
| 6,006,214 A | 12/1999 | Carey et al. |
| 6,014,137 A | 1/2000 | Burns |
| 6,052,526 A | 4/2000 | Chatt |
| 6,065,002 A | 5/2000 | Knotts et al. |
| 6,088,692 A | 7/2000 | Driscoll |
| 6,167,397 A | 12/2000 | Jacobson et al. |
| 6,269,368 B1 | 7/2001 | Diamond |
| 6,289,353 B1 | 9/2001 | Hazlehurst et al. |
| 6,327,628 B1 | 12/2001 | Anuff et al. |
| 6,351,747 B1 | 2/2002 | Urazov et al. |

FOREIGN PATENT DOCUMENTS

| | | |
|---|---|---|
| WO | WO 02/35316 A3 | 5/2002 |

OTHER PUBLICATIONS

Supplementary Partial European Search Report for European application No. 01988885.8 (EP1330697), dated Apr. 18, 2007, 8 pages.

Michelle Q. Wang Baldonado and Terry Winograd, "SenseMaker: An Information-Exploration Interface Supporting the Contextual Evolution of a User's Interest", CHI 97. Human Factors in Computing Systems, Atlanta Georgia, Mar. 22-27, 1997, Conference on Human Factors in Computing Systems, New York, ACM, US, pp. 11-18.

Baeza-Yates R., et al., "Modern Information Retrieval: Chapter 4: Query Languages" 1999, Addison-Wesley, Harlow. GB, p. 99, line 1-p. 109, line 5.

METHOD AND APPARATUS FOR QUERY AND ANALYSIS

CROSS-REFERENCE TO RELATED APPLICATIONS

This application is a divisional of U.S. Non-provisional Patent Application Ser. No. 09/698,873, "Method and Apparatus for Query and Analysis," by Annau et al., filed Oct. 27, 2000, now U.S. Pat. No. 6,804,662, the disclosure thereof incorporated herein by reference herein in its entirety.

FIELD OF THE INVENTION

The present invention is related to the field of data handling and analysis using information handling systems. More specifically, the present invention involves methods and/or system and/or devices that provide for advanced searching of a structured document set, including expressions for providing statistical analysis of document set search results.

BACKGROUND OF THE INVENTION

A number of techniques have been previously discussed for searching and analyzing data sets stored in an information processing system. The reader is assumed to have knowledge of SQL and other standard database and analysis packages as well as knowledge of search techniques and methods commonly used on the Internet.

Prior Patents and Publications

The following patents and publications may be related to the invention or provide background information. Listing of these patents here should not be taken to indicate that a formal search has been completed or that any of these patents constitute prior art.

U.S. Pat. No. 5,924,090 discusses a method and search apparatus for searching a database of records that organizes results of the search into a set of most relevant categories. In response to a search instruction from the user, the search apparatus searches the database, which can include Internet records and other records, to generate a search result list corresponding to a selected set of the records. The search apparatus processes the search result list to dynamically create a set of search result categories with each category associated with a subset of the records in the result list having common characteristics. Categories can be displayed as a plurality of folders. Each record within the database is classified according to various meta-data attributes (e.g., subject, type, source, and language characteristics). Substantially all of the records are automatically classified by a classification system into the proper categories. The classification system automatically determines the various meta-data attributes when such attributes are not available from the source. The technique discussed is directed to using category analysis to further narrow a set of returned documents. The technique is provided for public use at www.northernlight.com. For example, the search for "pamela anderson lee" at that site returns 19,043 total items and indicates 14 category folders. Each of these folders, when selected, displays a set of documents and a set of subfolders. For example, selecting the "Actors & Actresses" folder returns 2,587 documents and indicates 13 additional subfolders for those documents. The subfolder "Lee, Tommy" returns 151 items, and indicates 10 further subfolders. The sub-sub folder "rockcool.com" returns three total items. Neither the patent nor website discuss or provide techniques for expressing search strategies using category analysis nor methods or techniques that allow for other types of analysis to be performed on returned documents. The references also do not discuss expressing returned documents from an analysis as anything other than category folders and associated documents.

At the present time, querying and data mining/data analysis are generally considered two different fields with two different audiences. Querying is widely used by both data handling professionals and general computer users. Many websites (such as Altavista or Ebay) provide query ability using operators to all users, allowing users to specify document subsets using AND, OR, NOT or similar expressions. However, it has become an increasingly common scenario for users to receive an overwhelming list of results with no additional guidance as to how to further understand, prioritize or explore said results.

Data analysis, in contrast, is generally considered the province of data handling professionals. Analysis packages often require specialized training and use commands and syntax that are specific to a particular package. Data Mining/Data Analysis is generally considered a separate and specialized function apart from accessing data using queries.

SUMMARY OF THE INVENTION

The present invention, in particular embodiments, involves methods and/or systems that provide for combinations of traditional search capabilities with generalizible analytical functions. The combination of these two features into a single technology provides particular advantages when dealing with documents or structured documents (such as electronic catalogs, XML documents, text documents, HTML documents. etc.). In various embodiments, the invention includes powerful tools for expressing search/analysis requests, methods and systems for evaluating such expressions, and powerful ways to express results of such query analysis. (In this discussion, structured documents can be understood generally to refer to any data item or object that can be specified by a query, including such things as files, records, objects, etc. One type of document is a structured document.)

In particular embodiments, the present invention involves a proprietary software system that combines the functionality of a search engine and a data-mining/data-analysis engine. Search engines have traditionally focused on retrieving a list of documents, and data mining engines are generally designed to find statistical patterns amongst sets of data. By integrating these two technologies in a general way allowing for various analyses, in one aspect, the present invention can perform statistical analysis on collections of documents retrieved from a search. The results from these analyses can either be presented to an end user or used to search for another set of documents. In particular embodiments, the invention further allows for the construction of complex loops of search and analysis, creating a powerful new tool for managing information.

The following discussion describes the functionality of the present invention with reference to specific embodiments and illustrates its use through a set of examples. However, using the teachings provided herein, it will be understood by those of skill in the art, that the methods and apparatus of the present invention could be advantageously used in other situations that call for utilizing data that can be represented in an information processing system. The invention will be better understood with reference to the following drawings and detailed descriptions. In some of the drawings and detailed descriptions below, the present invention is described in terms of specific independent embodiments, including embodiments related to accessing a database of structured documents. This should not be taken to limit the invention, which it will be understood from the teachings provided herein has other applications.

Furthermore, it is well known in the art that logic systems can include a variety of different components and different functions in a modular fashion. Different embodiments of the invention may include different combinations of actions or elements. Furthermore, elements or actions that may be described below as being sub-elements of other elements, may be differently grouped in various specific embodiments. It will be clear from the teachings herein to those of skill in the art that in specific embodiments, some action steps may be performed in different order from the examples presented herein. For purposes of clarity, the invention is described in terms of systems that include many different innovative components and innovative combinations of components. No inference should be taken to limit the invention to combinations containing all of the innovative components listed in any illustrative embodiment. All publications, patents, and patent applications cited herein are hereby incorporated by reference in their entirety for all purposes.

DESCRIPTION OF SPECIFIC EMBODIMENTS

General Methods

Figure 2:
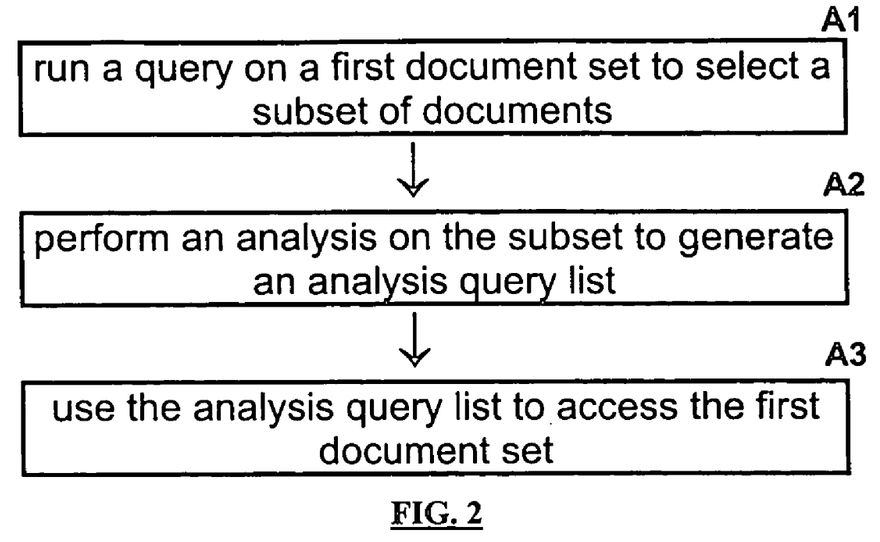
FIG. 2 is a flow chart illustrating a general method of data processing and selection according to an embodiment of the invention.

In particular embodiments, the invention can be understood as involving methods for data searching and data analysis. FIG. 2 is a flow chart illustrating a general method of data processing and selection according to an embodiment of the invention. As illustrated, a method according to specific embodiments of the present invention, involves performing a query to select a first set of documents, performing an analysis on that first set of documents to generate an analysis output, where the analysis output are queries derived from the first document set.

Figure 3:
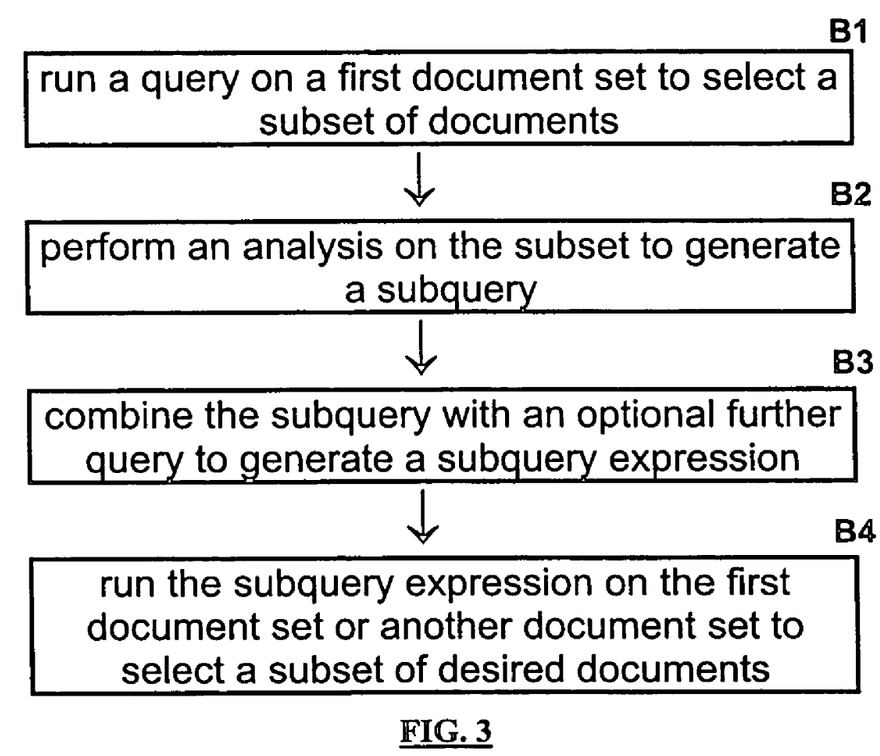
FIG. 3 is a flow chart illustrating a method of data analysis using subqueries and indirection according to an embodiment of the invention.

FIG. 3 is a flow chart illustrating a method of data analysis using subqueries and indirection according to an embodiment of the invention. As illustrated, a further method according to specific embodiments of the present invention, uses queries from an analysis, optionally combined with another query expression, to select an ultimate subset of documents.

Figure 4:
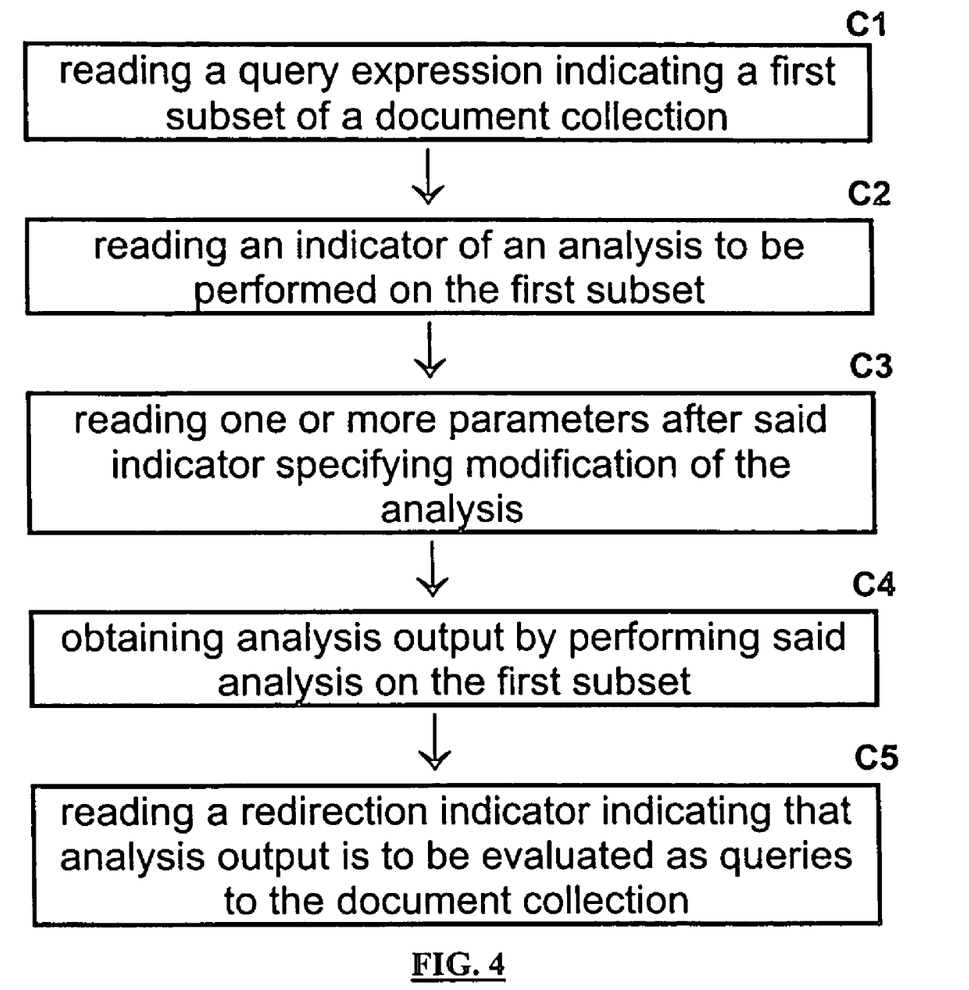
FIG. 4 is a flow chart illustrating a method for analyzing a complex query/analysis expression.

FIG. 4 is a flow chart illustrating a method for analyzing a complex query/analysis expression. According to specific embodiments of the present invention, an expression is evaluated by reading a query expression indicating a first subset of a document collection, reading an indicator of an analysis to be performed on the first subset, reading one or more parameters after said indicator specifying modification of the analysis, obtaining analysis output by performing said analysis on the first subset, and reading a redirection indicator indicating that analysis output is to be evaluated as queries to the document collection.

Query Expressions

In particular embodiments, the present invention is involved with a proprietary software system (which may herein be referred to as the QueryEngine (QE)) that combines the functionality of a search engine and a data-mining engine.

To illustrate with an example, suppose an initial keyword search for "dogsled racing" produces a result set of documents containing "dogsled racing." QueryEngine can analyze these documents to produce a list of the top four most frequent topics that occur amongst the documents, such as topic:Iditerod, topic.Alaska, topic:"winter sports", and topic:snow. According to further embodiments of the invention, these topics may either be presented to the user for selection, or QueryEngine can use the topics to automatically broaden the initial search to include documents found by these topics but that do not contain the phrase "dogsled racing" itself. These examples are just two of the many potential uses of the QueryEngine, further aspects of which, according to specific embodiments, are discussed in detail below.

In a particular embodiment, the present invention can be understood to search information in structured document collections. A structured document collection is a set of structured documents that each contain information subdivided into distinct fields. As an example, structured documents can be represented using XML as illustrated below:

EXAMPLE 1

Structured Document

<title>A Sample Structured Document</title>
<author>John Smith</author>
<keyword>sample document ripfire</keyword>
<body>A structured document with seven fields</body>
<topic>example</topic>
<topic>sample</topic>
<topic>structured document</topic>

For purposes of this example discussion, structured documents can be understood as ordered lists of terms, which are in turn composed of items referred to herein as tokens and fields.

A token (or value) is a sequence of characters that have a unique, atomic meaning. Examples of tokens are words, phrases, dates, product numbers, etc.

A field is a unique tag (or name) that identifies the context in which a token appears. Examples of fields are Title, Author, Keyword, Body, Address, Topic, Article Text, Product Description, Country of Origin, etc.

From the teachings herein, it will be understood to those of skill in the art that a plain text document can also be understood as a Structured Document containing a single field (such as Body) that consists of all the text in the document.

A term may be understood as a combination of a token and the field in which it appears. Terms are represented by the notation field:token, as in author:Smith. A term may also be referred to in the art and herein as a name/value pair.

Thus, a structured document can be understood as an ordered list of terms. This ordered list is also referred to as the document's contents. The above example structured document can be rewritten as a list of terms:

EXAMPLE 2

Structured Document as List of Terms (Or Name/Value Pairs)

title:A title:Sample title:Structured title:Document
author:John author:Smith
keyword:sample keyword:document keyword:ripfire
body:A body:structured body:document body:with
body:seven body:fields
topic:example
topic:sample
topic:structured topic:document A structured document collection can be understood as a collection of structured documents that can be identified. An identification can be made through various means, such as a document ID, a key field/value pair, or any other unique identifier. Such a structured document collection can be used to represent a variety of structured and unstructured information, such as news articles, database records, or Web pages. The organization of a structured document into fields suggests similarity to a database table, but unlike many databases, document collections do not enforce consistent field structure from document to document.

A query can be understood as a term or a combination of terms that selects a subset from a document set. In multiple term queries, terms can be combined by operators. Thus, the query author:Smith will select from a document set all documents with the token "Smith" in any field indicated by the name "author." A query such as author:Smith WITHIN 2° F. author:John will select all documents with John and Smith within two words of each other, etc. Note that, for purposes of this discussion, both terms and queries can be understood to include a variety of more complex expressions, including regular expressions or any other expressions in the art. For example, in specific embodiments, a valid term might have the form auth*:Sm?th, indicating any field with a field name beginning with "auth", having any five-letter value beginning with "Sm" and ending with "th". Thus a term can more generally be understood as field_expression:value_expression.

A simple query is the single term query, whose result set is composed of all documents containing the given term. Specific embodiments of the invention support various Boolean and other operators for combining terms in query, such as AND, OR, and NOT (as in the example title:cities AND author:dickens). In further embodiments, QueryEngine supports matching a document if it contains at least N of M given terms, and if a weighted sum of the terms exceeds a fixed threshold. In further embodiments, the invention can provide further linguistic functionality, such as expanding terms into terms with common stems (i.e., plant to plants and planting), related terms (i.e., plant to tree), and eliminating stopwords (such as the and of). Evaluating a query, in specific embodiments can be understood as computing a numerical score for a document based on the document's contents. The score assesses how well the document matches the query; if the score is zero, the document does not match the query. The method used to compute the score is known as a scoring metric.

A search is an attempt to match a user's request for information with information in a structured document set. This can involve a user specifying one or more terms and constraints on the terms (i.e., that they must all appear in the document or in sequence in the document) possibly combined with operators. When a query according to specific embodiments of the present invention is processed or evaluated, it returns a result set.

A result set, in specific embodiments, can be understood as a set of document identifications corresponding to documents that produce a nonzero score for a query. In further embodiments, a result set can include corresponding scores computed by a chosen scoring metric.

QueryEngine, according to specific embodiments of the invention, implements a set of standard information retrieval scoring metrics, including term frequency (the score is a function of how frequently the matching term or terms appear in the document), inter-document frequency (the score is based on the entropy or rarity of matching terms), and combinations of the two. Scorings can also be influenced by user-specified multiplicative weightings of particular terms. In particular embodiments, relevance rankings can be used to determine the order of returned queries. A simple method of query evaluation or scoring metric, can be understood as returning two scores: a "1" or "true" for documents that match the query, and a "0" or false for documents that do not.

Expanding Queries (Fallback)

According to further specific embodiments of the present invention, a query engine or query method can include a "query fallback" procedure designed to make sure that a query returns an adequate number of results, but not at the expense of accuracy. A fallback method is a set of rules, going from most specific to least specific, that can take the terms of a query and incrementally expand the scope of constructed queries. One example of such set a of rules is:

1. Run query as an exact phrase
2. AND query terms together, e.g. regardless of proximity or order
3. AND all possible linguistic variations of query terms together (dog→dog, dogs, dogged)
4. AND stems and synonyms of query terms together (dog→dog, dogs, dogged, pup, puppy)
5. (Results of #4) plus OR query terms together According to specific embodiments of the present invention, these variations on queries are attempted in sequence until the number of results exceeds a specified threshold (e.g. 20 results), at which point the process stops and the results are returned. Note that each query on the list is a superset of the preceding query, which is typical but not required. One can also distinguish exact matches (such as #1 and #2) from loose matches (#3-#5) when returning results.

When a query is used to specify an input to an analysis, as discussed below, this type of fallback can be used to ensure that the analysis has a sufficient set of documents to provide meaningful results. In particular example embodiments, an analysis identifier can be associated with information regarding an optimal minimum number of returned query results, either inherently or based on analysis parameters. For example, a ROLLUP 10 analysis could indicate to its associated query expression that FALLBACK should be used until at least 10 (or some other number) documents are available for the analysis.

Analyses on Result Sets

While the present invention supports a broad range of query functionality, the invention further allows combination of searching with result set analyses. An analysis is a function that takes as input set of documents and based on the documents' contents performs additional analysis actions, such as grouping into subsets of documents. In a further embodiment, the subsets that are output by an analysis are represented by the query that would return the subset when ANDed with a query that produced the original result set.

The present invention, in further embodiments, provides powerful generalized tools for performing different types of analysis on a result set and for expressing those analyses and their outputs. Various types of analyses can be implemented according to the present invention, some examples of which are provided below.

Rollup

A rollup analysis determines N subsets by the documents that contain each of the top N most frequent terms from a particular field or set of fields. For example, suppose for the query product: "patio furniture" on a document set there are three different vendors in vendor fields. Rollup on the vendor field might produce subsets, for example, represented by the queries vendor:sears, vendor:suncast, and vendor:lakeland. In specific embodiments of the invention, analyses produce as their output one or more queries, any of which can be single terms. Document identifications corresponding to a subset can be retrieved by ANDing the original query (in this example, product:patio_furniture) with a specific returned query (such as vendor:sears). This allows results of the analysis to be generalized and further utilized by providing a succinct description of the groupings, not just the member elements. In a further embodiment, the proportion of the vendors determined by rollup can be indicated in the returned query as a weighting describing each subset. This is discussed further below.

Thus, it will be understood from the teachings herein, that according to specific embodiments of the invention, running or evaluating a query returns a set of document identifications; while performing an analysis on a set of document ids returns one or more queries. As described below, the present invention according to further embodiments, allows expression of both operations in various combinations according to a succinct and flexible syntax.

Partition

A second example analyses is a partition. Partition forms N subsets (each described by a query) that are as distinct and equally sized as possible. Because a subset can be described with any legal query, analyses can produce subsets that are described with AND queries, OR queries, match N of M queries, etc.

In one embodiment, a partition analysis can, for example, facilitate a user's drill down through an initial result set. Consider a search of news articles for headline:congress with a partition analysis on the results by a topic field. If all resulting documents contain topic:politics, partition will not use that term to form a subset because that term eliminates no articles and thus provides no partitioning. If the two terms topic:finance and topic:budget produce heavily overlapping results, partition generally selects only one of the two as a subset because the terms are redundant. In general, the partition analysis algorithm is designed to choose subsets that have the widest variety.

In a further example embodiment, an analysis such as partition can use an "includes fields" characteristic in the analysis. For example, if ⅓ of the documents include a field AUTHOR and the other ⅔ do not, this characteristic can be used to generate a partition according to specific embodiments.

Categorize

A Categorize analysis defines subsets by patterns of terms that tend to occur together, in contrast to rollup and partition, which analyze terms individually. For example, a news archive might have a keywords field that lists of up to twenty keywords for each article, and many articles share sets of keywords. A categorization of a search on headline:microsoft might yield the three subsets expressed by the three following queries:

--- keywords:"bill gates" AND keywords:ceo AND keywords:profile
keywords:antitrust AND keywords:"department of justice"
keywords:"earnings report" AND keywords:"sales figures" AND keywords:stocks

---

For each subset, the Categorize algorithm found a pattern of multiple keywords that tended to occur together, suggesting an interesting subgrouping of the result set.

Underlying algorithms for any of the above analysis can be either proprietary methods or known statistical analysis methods.

Compare

A compare analysis compares results sets of two queries to determine which terms differentiate the two results sets. Compare evaluates all terms found in the documents of the two results sets and scores each term by how much it differentiates the first set from the second. For example, a term that occurred frequently in the first set but rarely in the second would receive a high positive score, and a term that occurred at the same frequency in both sets would receive a score of zero. A typical use of a comparison query is to find out which terms are most characteristic of a particular document set when compared to a background or control group. For example, analyzing the terms that are characteristic of documents containing keywords:"ice hockey" compared to documents containing keywords:sports would highlight the term keywords:puck but not keywords:fan or keywords:team.

In further embodiments according to the invention, outputs returned from an analysis are returned as queries. Because of this, a system according to the invention can use these queries to search for one or more additional sets of documents. For example, suppose one wanted to find gardening tools made by vendors who also make patio furniture. The three vendor queries resulting from ROLLUP performed on the product: "patio furniture" example discussed above could be ORed together, then ANDed with product: "gardening tool" to produce this result.

Indirect Query (or Subquery)

In a further embodiment, QueryEngine provides a facility, called a subquery, for feeding an analysis into another level of querying. In various embodiments, this facility can be indicated by using a particular indicator word, e.g. SUBQUERY. Alternatively, this facility can be indicated using a pair of parenthetical characters, such as ( ), < >, or [ ]. In a particular embodiment, the subquery facility can be indicated by placing curly brackets { } around an analysis expression. The subquery facility allows the queries returned by that expression to be combined with other query expressions. Specific embodiments of this are illustrated in the examples herein. This type of expression allow indirect referencing, indicating that there is not specific interest in the documents or queries returned by the subquery expression, but instead what is wanted is the output of an analysis performed on those documents. This output is a set of queries that are going to be combined. Thus the subquery expression can be understood containing an expression (including query and analysis) which, when run or evaluated, returns a document set. Within the subquery is an indication of a document set (e.g. a query) and an analysis. In particular embodiments of the invention, it may be helpful to understand that a query, when run or evaluated, is turned into a document set. A document set, when an analysis is performed on it, is turned into one or more queries.

Results Output

In various embodiments, the results output for a query and/or and analysis can be in a variety of formats. Document set results, for example, can be provided as any appropriate expression or list identifying document or document pointers. Analysis results can include any way of indicating the resultant query.

However, according to a specific embodiment, results output of the present invention are output in the form of an XML or an XML-like results file. Note that in specific embodiments, this output format makes it particularly easy to output, for a query plus analysis expression, results for both the query portion alone and for the analysis performed on the query expression. As an example format for a results output, consider the following request:

```
product:"patio furniture" OR description:"patio furniture"
    ROLLUP vendor TAG vendor_breakdown PRINT
    RESULTS 1 TO 5
```

A result output in XML-like format in a particular example could have the format:

```

<docset>
<group tag="vendor_breakdown" type="rollup" total="55">
    <query>vendor:sears[.55]</query></group>
<group tag="vendor_breakdown" type="rollup" total="32">
    <query>vendor:suncast[.32]</query></group>
<group tag="vendor_breakdown" type="rollup" total="13">
    <query>vendor:lakeland[.13]</query></group>
<doc score="4" key="sku"><field
    name="sku">100345</field></doc>
<doc score="4" key="sku"><field
    name="sku">209788</field></doc>
<doc score="2" key="sku"><field
    name="sku">100098</field></doc>
<doc score="2" key="sku"><field
    name="sku">109004</field></doc>
<doc score="2" key="sku"><field
    name="sku">104455</field></doc>
</docset>

```

In this example, the outer tag "results" indicates the total number of results and that the selected results of interest are only 1-5. Items shown that received a score of 4 did so because they matched in both description and product fields (with two terms each). In this example, items are ranked in order of decreasing score.

The group information (the three initial group results, which can also be understood as an analysis result) is represented separately from the individual matching documents. The group information also includes the total number of items are in that group and includes a query used to describe the group. In this example, documents are identified by a key field, which in this case is "sku." This field can be automatically reported when results are returned.

Functional Block Diagram

Figure 1:
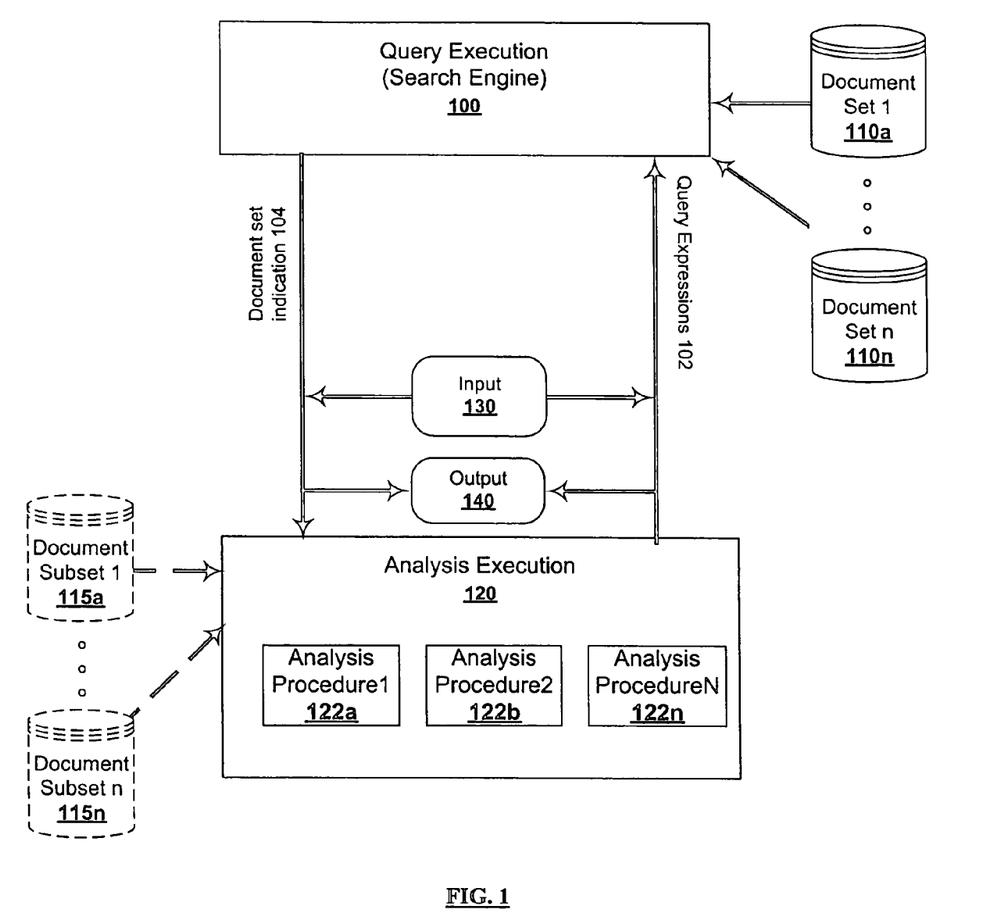
FIG. 1 is a functional block diagram illustrating an example system according to specific embodiments of the present invention.

FIG. 1 is a functional block diagram illustrating an example system according to specific embodiments of the present invention. As shown in the figure, a system and or method according to the invention can be understood as comprising a query execution module 100, which receives and input a query expression 102 and by running that expression on one or more document sets 110, produces a document subset 104, which may be indicated by document Ids or any other indication.

Analysis execution module 120 receives as input some document set or subset (such as 104 or alternative optional subsets 115) and produces as output a query expression 102. Note that module 120 comprises at least two different analysis procedures 122 that may be invoked on the input to perform the output.

The figure further illustrates that one of the powers of the present invention is that a subset produced by 100 can be the input to analysis module 120 and the query output of analysis 120 can be the input to query execution 100.

Input access 130 and output access 140 are illustrated to indicate that input and output can be accessed to or from either path in the system. Input 130 can be in the general form of a document set indication (including a query expression, a list of document identifications, or any other document set indication) with a request for an analysis. Likewise an output 140 can be retrieved either in the form of a set or list of document identifications or in the form of a query expression. As will be further understood from the teachings herein, a single expression can be written starting at either primary logical path (102 or 104) and can require a number of loops through the system for complete analysis until the desired output point is reached.

In various embodiments, FIG. 1 can be understood as a logic diagram that closely represents logic flow in an actual system embodying the present invention or as a conceptual functional diagram for a logical system that is implemented with different actual components.

EXAMPLES

The examples below use a specific novel syntax for specifying queries and analyses. This syntax is further described in more detail below. This specific syntax is provided as an example and to provide a complete discussion, but should not be taken to limit the invention except as provided in the attached claims.

Example #1

Rollup-Based Query Expansion

Consider the example mentioned above, of finding articles with content: "dogsled racing" and wanting to expand the search to include the top most related documents based on the content of one or more topic fields in those documents, not just documents that match on the specific phrase. This can be accomplished by ORing the original query with a subquery from a rollup analysis of the field topic:

```
content:"dogsled racing" OR {content:"dogsled racing" ROLLUP
        FIELDS topic TOP 3}
```

In this example, what is returned from the { } expression can be understood as a query that is evaluated over the original set. Thus, the expression within the { } evaluates to a query that is something like:

```
topic:alaska OR topic:sports OR topic:outdoors
```

The { } indicates that this query should then be run against the original superset of documents of interest and the results returned. Therefore, the entire example expression above will provide the same document set as the expression

```
content:"dogsled racing" OR topic:alaska OR topic:sports OR
        topic:outdoors
```

If the items in the topic field tend to group together, a more useful analysis would be categorize on the topic field. For example, one of the topic values might be alaska, which is quite general, but in the context of dogsled racing it is always grouped with sports and outdoors. Using categorization would maintain this grouping, making the topic field expansion far more specific:

```
content:"dogsled racing" OR {content:"dogsled racing" CATEGORIZE
    FIELDS topic TOP 10}
```

In this particular example, "CATEGORIZE FIELDS topic TOP 10" analysis is performed on the subset of documents represented by content: "dogsled racing". The { } returns the set of queries, which can then be run against the original document set (or a different indicated document set) and combined in this case using an OR with the query content: "dogsled racing."

Example #2

More Like This Item or These Items

As a further example, consider trying to find a product, such as a sink, that is similar to a reference product or products based on its attributes (expressed as field values), such as vendor, color and style. These attributes can be retrieved by performing a rollup on the reference product or products across the fields in question. In cases where the notion of similarity may be more important along certain dimensions than others, a specific embodiment of the invention can accommodate this allowing an expression of differential weightings of the attributes. As an example, the following query finds sinks that are similar to the two SKU's (product ID numbers) 4589 and 3214:

```
product:sink AND {sku:4589 OR sku:3214 ROLLUP FIELDS
        vendor,color[.5], style[.25]}
```

From the teachings provided herein, it will be seen that this expression returns SKUs that are most like the two SKUs that are shown, with vendor most important selection characteristic, color the next most, and style the least important characteristic. The expression inside the { } resolves to something like:

```
vendor:v1 OR vendor:v2 or vendor:v3 or style:victorian[.25] OR
    color:avocado[.5] OR color:teal[.5] OR color:antique
        white[.5].
```

When evaluated, this expression resolves into an ordered list, with items ranked based on how well they match the weighted terms. This list is then ANDed with product:sink to produce the weighted list only containing those documents that are sinks.

Example #3

Previous Purchases

As a further example, consider two different types of documents loaded into the QueryEngine: products and customer purchase histories. The two document types can be distinguished with a type field, as either type:product or type:purchases. The two document types share a common field, sku. For products, sku is a key field referring to the SKU number of the individual product. Purchase histories may have many SKU's, referring to the products an individual has purchased. In database terminology, the SKU field of purchases is a foreign key referring to products. By using a rollup analysis, these two documents types can be tied together in a single query that searches for sinks that customer #1345 has previously purchased:

```
type:product AND product:sink AND {type:purchases AND
        customer:1345 ROLLUP FIELDS sku}
```

In this case, the expression inside { } are evaluated on the type:purchases document or documents belonging to customer: 1345. From that, ROLLUP produces a set of SKU: #### terms, representing SKU's of all items purchased by customer:1345. The query expressions outside the { } then limit this document set to product:sink and type:product documents.

Note that the complementary function may also be useful in specific applications—display only those sinks that the user has not previously purchased:

```
type:product AND product:sink AND NOT {type:purchases AND
        customer:1345 ROLLUP FIELDS sku}
```

Example #4

Personalization

Consider the scenario of promoting items that have the same vendor as a user's previous purchases to the top of the query results list. This requires first finding the SKU's the customer has previously purchased (see previous example), then rolling up vendors from these records, and finally using this to tag the items from a general search (such as for a sink) which match these vendors and using this to control results ordering:

```
type:product AND product:sink GROUP QUERY {type:product AND
{type:purchases AND customer:1345 ROLLUP FIELDS sku} ROLLUP
FIELDS
vendor} TAG personalized PRINT ORDER personalized,*
```

Example #5

Vendors with Good Sell-Through

Consider the scenario of promoting vendors which have good sell-through, which means vendors whose sell products are a higher proportion of sales than of SKU's in the catalog (vendor X has good sell-through if it represents 80% of sales but only 40% of products). This involves using the comparison analysis to compare products weighted by their sales to products overall across vendors. The following query chooses to use an interleaved ordering for displaying vendors with good sell-through:

```
type product AND product:sink
   GROUP QUERY
      (type:products AND {type:purchases ROLLUP FIELDS sku}
         COMPARE QUERY type:products FIELDS vendor USING
         SCORE)
      TAG sellthrough
      PRINT INTERLEAVE sellthrough,*
```

The present invention has thus far been described in part in terms of general methods and devices. The previous description is believed to be a full and complete description sufficient to allow an ordinary practitioner in the art to make and use the invention. It will be understood to those of skill in the art from the teachings provided herein that the described invention can be implemented in a wide variety of specific programming environments and logical systems (such as UNIX, Windows, Solaris, Oracle, etc.) using a wide variety of programming languages (such as SQL, Visual Basic, Pascal, C++, Basic, Java, etc.) and wide variety of file formats.

What follows are further descriptions of example systems and methods that embody various aspects of the present invention. This following discussion is included, in part, in order to disclose particularly preferred modes presently contemplated for practicing the invention. It is intended, however, that the previous discussion and the claims not be limited by examples provided herein. It is further intended that the attached claims be read broadly in light of the teachings provided herein. Where specific examples are described in detail, no inference should be drawn to exclude other examples known in the are or to exclude examples described or mentioned briefly from the broad description of the invention or the language of the claims. It is therefore intended that the invention not be limited except as provided in the attached claims and equivalents thereof.

Language Specification According to Specific Embodiments

What follows is an example detailed language specification for a query and analysis system and related language according to specific embodiments of the present invention. This detailed discussing is provided chiefly as examples, and is intended not to limit the invention as detailed in the attached claims.

Query System Requests

In an example query engine system according to specific embodiments of the invention, there are four types of query engine requests: query_request, indexing_request, configuration_request, and special_request. A query_request is a query expression that can select set or subset of indexed documents and optionally can request analyses of the contents of those documents. An indexing_request is a request to add or delete a document from a searchable collection. A configuration_request is a request to inspect or change persistent runtime properties of a query engine system. A special_request is a catchall category for miscellaneous requests that include various status requests and a command to shut down the server.

Query Request

A query_request according to specific embodiments of the present invention can have the general form: query analysis formatting logging.

The query portion selects a set of documents, the analysis portion describes statistical analyses to be performed on the selected documents, the formatting portion controls what is contained in the output of the query, and the logging portion specifies additional client-side information to insert into the query logs. In various embodiments, the analysis, formatting, or logging portions are optional.

Query

A query selects the documents of interest from a document collection. It is composed of search operators (i.e., Boolean operators, match N-of-M, etc.) acting on a set of terms. The simplest query is a request for a single term: all documents containing this term are returned. More powerful queries can be built up using operators, examples of which are discussed below.

A field is a label for a section of the document, and is generally restricted to an alphanumeric sequence, with the addition of '@' sign as a possible first character to denote special fields and the '_' and '.' characters allowed after the first character.

A token is either a block of non-white space characters which doesn't contain any of the bracketing delimiters (such as ( ) [ ] { }") or a phrase, which is any sequence of characters delimited by quotes ("). Quote characters can be contained inside phrases by using an escaped quote (\").

In a further embodiment, fields can be aliases for groups of fields. Field aliases are defined as persistent runtime properties of the query engine. An example definition of a field alias "all" would be: all=first_name, last_name, address, phone_number. With this definition, a search for all:smith would yield results in documents containing "smith" in any of the listed fields.

A note on capitalization according to specific embodiments of the present invention: all lower case queries match any case in the original document. Use of specific patterns of upper case are exactly matched in the original document. For example, if the original document used "Jones" as a last name, last_name:jones and last_name:Jones would match but not last_name:JONES.

To accommodate variations in language usage, a query engine system in particular embodiments has a set of term modifiers. Two of the modifiers, NORM and RELATED expands a single term into a list of possible matches, based on word normalization and word relationships, respectively. For example, NORM allows one to specify the word dog but also match the words dogs and doggy. RELATED would allow one to match words such as puppy and pet. STOPWORD blocks words which have no semantic content, such as articles (a, an, the). The specifications of normalizations, related words, stopwords, and field aliases can be customized from the default with a DEFINE command.

In the examples below, the first query will match any title with gone and wind in it, since the and with are blocked as stopwords. The second example searches for title:plant, title:plants or title:planting. Modifiers can be chained together so that their expansions are carried out in series. The third example illustrates this, first expanding puppy into related terms such as dog, then applying word normalization to match puppies and dogs. Generally, modifiers only modify the next term or parenthetical expression, so in the fourth example, NORM only applies to title:cat and not title:owner, but in the fifth example, NORM modifies both terms.

1. STOPWORD (title:gone AND title:with AND title:the AND title:wind)
2. NORM title:planting
3. NORM RELATED topic:puppy
4. NORM title:cat title:owner
5. NORM (title:cat title:owner)

Terms may be combined with the set of standard Boolean operators, AND, OR, and NOT. The query operators have simple precedence rules: the highest precedence is the unary NOT, followed by AND, then OR. Operator precedence can be more clearly specified or overridden by using parenthesis.

Scoring and Weighting

In specific embodiments, each matching document can be scored by how well it matched the query. The default scoring mechanism is to count how many of the query terms were contained in the document. Scorings can be adjusted by providing differential weightings to each term by enclosing a floating-point number in square brackets after the term. If no weighting is specified, the default weighting is 1. A weighting can also be placed around a parenthesized query, in which case the weight multiplies the score inside the parentheses. Weighted terms generally can have the form modified_term[weighting] OR (query)[weighting]. For example, in the query first_name:ed AND (last_name:smith [2] OR last_name:jones[4]), "Ed Jones" would receive a score of 5 and "Ed Smith" a score of 3.

Match and Threshold Query Operators

Two additional query operators are MATCH and THRESHOLD. MATCH matches a document if at least n terms in its list are contained in the document. THRESHOLD matches a document if the score the specified query is greater than or equal to threshold_value.

Some examples of MATCH and THRESHOLD queries are presented below. The first matches if two of its three terms are in the document. The second is the equivalent of a first, but done in terms of THRESHOLD. In the third case, the document would match if it contained all three terms or just first_name:john and address:"main street", but in no other situation, including first_name:john and last_name: smith. This could not be accomplished with MATCH. Also note that a THRESHOLD 1. MATCH 2 OF (first_name:john last_name:smith address:"main street")
2. THRESHOLD 2 SCORE OF (first_name:john OR last_name:smith OR address:"main street")
3. THRESHOLD 1.5 SCORE OF (first_name:john[1.0] OR last_name:smith[0.25] OR address:"main street" [0.5])

The RANGE query is used in conjunction with numerically valued fields. It places a restriction on the range of the value of the field. The range is specified by either greater than or less than signs or a combination of parentheses and square brackets, where the parenthesis indicate exclusive ranges (bound is not in the range), and the brackets indicate inclusive ranges (bound is in the range). For example, the first line below matches if the price is greater than or equal to five, the second in the range between 2 and 3, inclusive. The last matches if the price is greater than 2 but less than or equal to 3.5.

1. RANGE price=5
2. RANGE price[2, 3]
3. RANGE price[2, 3.5]

Query Definition

Now that all query types have been specified, the query definition itself can be specified. A query is a combination of all definitions above plus an optional section that influences the scoring of the query.

| query_clause := | weighted_term |
|---|---|
| | or |
| | match |
| | threshold |
| | range |
| | term |
| | subquery |
| query := | query_clause |
| | query_clause SCORE scoring_clause |

Scoring Operators

One type of clause that can appear in scoring_clause is the BONUS operator, which is followed by a query, e.g. BONUS (query). If the query matches, its score is added to the total document score.

The second type of clause is a specification of the scoring metric scheme used for computing the score of the query. The default method discussed above for scoring is to give each term that appears a score of one, weighted by any specified weighting. This is known as the BOOLEAN metric, but there are other methods. The TF (term frequency) method scores each term by the number of times it appears in the document. The LOGTF method scores terms by the logarithm of one plus the term frequency: log(1+TF).

The IDF (inter-document frequency) method measures the rarity of a term amongst documents with respect to the frequency of a given reference_term. Let $n_t$ be the number of documents in which both the term to be scored and the reference_term appear. Let $n_{ref}$ be the number of documents in which the reference_term appears. The IDF score is then (log $n_{ref}$)−(log $n_t$). This number is small for common terms and large for rare terms.

The reference_term is crucial because it allows the distinction between contexts in which the term is used (i.e., different document types). The metrics TFIDF and LOGTFIDF are multiplications of the TF (or LOGTF) and IDF scores. Finally, the FLAT metric gives each matching document a score of one, no matter how many or which terms match. Note that BONUS and METRIC can be used in combination.

```
metric       :=  METRIC metric_type metric_type :=  BOOLEAN

TF

FLAT

LOGTF

IDF  reference_term

TFIDF  reference_term

LOGTFIDF reference_term
```

Manual Scoring

An alternative to using scoring based on individual terms is to simply use the value of a particular numerical field. This can be accomplished with the RANK keyword, which scores the query_clause with the value of the subsequent numerically valued field field_name. If a particular document is missing a numerical value for this field, a value of zero is used, unless another default value is specified with a DEFAULT clause, e.g. rank := RANK field_name, or rank := RANK field_name DEFAULT default_value.

Analysis

An optional analysis portion of a query_request describes which statistical analyses are to be performed on the documents selected by the main query. An analysis generally performs an algorithmic analysis of the terms within the selected documents and returns a set of queries that describe a subset of the documents. For example, the ROLLUP analysis ranks the term in the documents of the results set from most frequent to least, and produces a set of queries, one for each term weighted by frequency. Suppose for the query product:"patio furniture" ROLLUP vendor there were three vendors that made patio furniture. The three queries returned from ROLLUP might then be vendor:sears[0.5], vendor:suncast[0.3] and vendor:lakeland[0.2], meaning that half of the merchandise is Sears brand, 30% is Suncast and 20% Lakeland. As indicated elsewhere herein, each of these vendor queries could ANDed with the original query and evaluated to produce a meaningful subset of the original result set.

In this example, there are four other types of analyses. CATEGORIZE finds categories amongst the result set documents based on frequent groupings of terms. PARTITION finds efficient partitions of the result sets using individual terms. COMPARE determines the differentiating power of terms from one group to another. Finally, GROUP, which uses a user-defined query to define a subgrouping of the result set. Generally, an analysis specification can be followed by a parameter_list.

Multiple analyses can be performed by concatenating analyses. The parameter_list either provides required side information to each analysis or modifies its default behavior. For example, the parameter TOP n restricts the reported analysis to only the top n highest ranked findings. Table 1 is a table of the parameters, their meanings, and the analyses to which they apply.

TABLE 1

| parameter | Function | Applicable analyses |
|---|---|---|
| TOP n | Return the top n results of analysis | ROLLUP (optional)<br>CATEGORIZE (required)<br>PARTITION (required)<br>COMPARE (optional)<br>GROUP (optional) |
| BOTTOM n | Return the bottom n results of analysis | ROLLUP (optional)<br>GROUP (optional) |
| METRIC metric_type | Specify the metric used for analysis of terms | ROLLUP (optional)<br>CATEGORIZE (optional)<br>PARTITION (optional)<br>COMPARE (optional) |
| USING SCORE | Weight terms in analysis by document score from query | ROLLUP (optional)<br>PARTITION (optional) |
| QUERY query | Specify a query to be used either for the comparison in COMPARE or to identify the group in GROUP | COMPARE (required)<br>GROUP (required) |
| TAG tag_name | Identify the results of this analysis with a tag | ROLLUP (optional)<br>CATEGORIZE (optional)<br>PARTITION (optional)<br>COMPARE (optional)<br>GROUP (optional) |
| SAMPLES n | Specify that a maximum of n samples of result sets be used for computing statistics | ROLLUP (optional)<br>CATEGORIZE (optional)<br>PARTITION (optional)<br>COMPARE (optional) |
| FIELDS field_list | Specify which fields in document are to be used for analysis | ROLLUP (optional)<br>CATEGORIZE (optional)<br>PARTITION (optional)<br>COMPARE (optional) |

Subquery

A subquery is a query formed by the analysis of another query. For example, a subquery could be the top five most frequent states of residence of people whose last name is Smith. This involves first finding all people with last name Smith, then analyzing this list for the top five most frequent states of residence. The subquery takes results of this analysis and forms an OR query, in this case an OR query involving five states. According to specific embodiments of the present invention, a syntax for a subquery is to enclose a query and an analysis inside of curly brackets. In the example above, the subquery would be {last_name:smith ROLLUP TOP 5 FIELDS state}. Subqueries are a powerful way to combine search and data analysis.

Formatting

Formatting is an optional portion of a query_request that controls what will be contained in the output of the query. The formatting clause can begin with a PRINT directive and is followed by one or more formatting_clause statements, which are currently of two types, results and fields.

A RESULTS clause specifies a subrange of results to print. Results are numbered beginning with one, not zero, and are ranked in order by descending score, and amongst identical scores, ascending ID number. Therefore, RESULTS 1 TO 10 prints the first 10 results. The keyword LAST refers to the last result from the query, e.g. RESULTS n TO m; RESULTS n TO LAST.

An INTERLEAVING clause allows an alternative to ranking documents by overall score, which is to interleave documents by their scores from tagged analysis queries. For example, product:"patio furniture" ROLLUP TOP 3 FIELDS vendor TAG vendors PRINT INTERLEAVING vendors.1,vendors.2,vendors.3 would print results such that the top three most frequent vendors would be interleaved starting at the top of the list until results from these vendors was exhausted. The remaining results would then follow. Interleaving a results set does not change the total number of results, just the order in which they are presented, e.g. INTERLEAVING tag_list.

A TAG * can denote the original scored ranking, so that product:"patio furniture" GROUP QUERY vendor:sears TAG promotion PRINT INTERLEAVING promotion, ¤ would print Sears brand patio furniture interleaved with all other results.

A FIELDS clause specifies fields to print along with each result. For example, first_name:john PRINT FIELDS last_name would print the last names for all Johns. Multiple fields can be specified in a comma-delimited list. Specifying ¤ as a field list indicates that all fields should be printed.

A KWIC clause specifies that fields containing the terms which matched the query should be surrounded with a special XML tag (KWIC stands for "Key Words In Context"). The tag can be user-specified with the TAG clause. The number of surrounding terms can be restricted with the WINDOW clause. If n is zero, only the term itself is printed, and if n is five, the five terms before and after the match are printed as well.

Logging

An optional logging portion of query_request specifies additional client-side information to insert into the query logs. The logging clause starts with the LOG token and is followed by one or more log_element, each of which is broken into a key/value pair. When the log is written, all elements are recorded with these key/value pairs. Note that element_value has the same regular expression as a token, e.g. LOG log_element, where log_element := element_key element_value. As an example, the query all:cars LOG user "joe smith" would return results for a query about cars and insert into the query log file the value joe smith under the key user.

Indexing Request

An indexing_request is a request to add or delete a document from a searchable collection, e.g. ADD followed by a document indication. DELETE deletes documents that match a specified query, e.g. delete := DELETE query.

Configuration Request

A configuration_request is a request to inspect or change persistent runtime properties of the query engine. Inspecting is accomplished by a list request, and changing is accomplished with define. Runtime properties are denoted by keys that are divided into multiple namespaces. For example, one of the namespaces is alias, which contains all field aliases. The name of each alias is its key. The definition for a particular alias can be inspected with the LIST keyword. Note that namespaces and keys are alphanumeric with the addition of the _.- characters. These commands can have the general form: LIST namespace key or DEFINE namespace key definition.

For example, LIST alias all returns the definition for the alias all. If the key is terminated with a ¤ wildcard character, then all keys beginning with the specified characters are returned. Runtime properties can be set by specifying their definition with DEFINE. The definition is considered everything left on the line after the key until the newline. Wildcard characters are not allowed in DEFINE keys. Example defined namespaces include:

| | |
|---|---|
| NORM | Word normalizations (i.e., stems, common misspellings, alternative spellings or phrasings) |
| RELATED | Related concepts (i.e., synonyms, words related by topic, etc.) |
| STOPWORD | Stopwords (e.g., non-content bearing words) |
| ALIAS | Field aliases |
| MACRO | Macros (see below) |
| PARAMETER | Server parameters (i.e., cache size, maximum result set size, etc.) |

System Special Request

Special request system requests can include such commands as PING, STATUS, or DIE. The purpose of PING is to check to see if the query engine is still alive. If the query engine is responding, it sends the simple message ALIVE back to the client. The PING command is used by a monitoring program keepalive that tests the query engine on a regular interval (i.e., every second), and restarts it if it fails to respond within a set timeout interval. The STATUS command is similar to the PING command but is more verbose. It provides information such as how long the query engine has been up and how many connections it has handled (not including PING or STATUS requests). This is useful for monitoring performance and load. The DIE command tells the query engine to stop handling incoming requests, finish handling any currently outstanding requests, and then gracefully exit. The most frequent scenario for a query engine receiving a DIE request is that when a new query engine starts up listening on the same socket, it sends the current query engine the DIE command. The new query engine then takes over the socket and query service is very briefly interrupted.

Macro Preprocessor

The query engine preprocesses requests for predefined macros, whose definitions are query engine runtime properties. A macro is invoked by using its name as follows: MACRO macro_name. Macros can be used anywhere in a request, and their effect is to simply substitute the macro's definition in place of the macro clause. For example, the macro out_of_state could be defined as the query NOT resident:CA. A query using the macro would have the form last_name:jones AND MACRO out_of_state. Macros, as part of the query engine runtime properties, can be set at run-time with DEFINE. In this example, therefore, the meaning of out_of_state could be changed at run time by an administrator. For example, an administrator in another state might change out_of_state to be NOT resident:NY.

Embodiment in a Programmed Information Appliance

Figure 5:
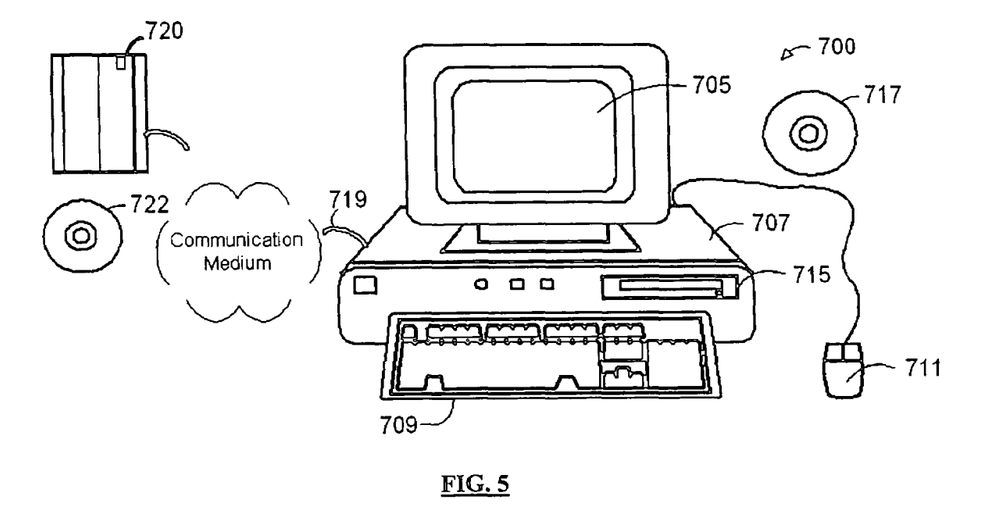
FIG. 5 is a block diagram showing a representative example information appliance in which the present invention may be embodied.

FIG. 5 is a block diagram showing a representative example information appliance in which the present invention may be embodied. The invention can be implemented in hardware and/or software. In some embodiments of the invention, different aspects of the invention can be implemented in either client-side logic or a server-side logic. As will be understood in the art, the invention or components thereof may be embodied in a fixed media (and/or transmissible) program component containing logic instructions and/or data that when loaded into an appropriately configured computing device cause that device to perform according to the invention. As will be understood in the art, a fixed media program may be delivered to a user on a fixed media for loading in a users computer or a fixed media program can reside on a remote server that a user accesses through a communication medium in order to download a program component.

FIG. 5 shows an information appliance (or digital device) 700 that may be understood as a logical apparatus that can read instructions from media 717 and/or network port 719. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media, magnetic tape, solid state memory, etc. The invention may be embodied in whole or in part as software recorded on this fixed media. Communication port 719 may also be used to initially receive instructions that are used to program such a system and may represent any type of communication connection. In such a system, a program may initially reside on a server media (such as 722) and be delivered by a server (such as 720) over a communications network.

The invention also may be embodied in whole or in part within the circuitry of an application specific integrated circuit (ASIC) or a programmable logic device (PLD). In such a case, the invention may be embodied in a computer understandable descriptor language that may be used to create an ASIC or PLD that operates as herein described.

Other Embodiments

The invention has now been described with reference to specific embodiments. Other embodiments will be apparent to those of skill in the art. In particular, a user digital information appliance has generally been illustrated or described as a personal computer. However, the digital computing device is meant to be any device for handling information could include such devices as a digitally enabled television, cell phone, personal digital assistant, etc.

Furthermore, while the invention has in some instances been described in terms of client/server application environments, this is not intended to limit the invention to only those logic environments described as client/server. As used herein, "client" is intended to be understood broadly to comprise any logic used to access data from a separable system and "server" is intended to be understood broadly to comprise any logic used to provide data to a separable system.

It is understood that the examples and embodiments described herein are for illustrative purposes only and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A method of selecting desired documents from a document collection comprising:
    reading a first query expression from a user-executable search engine, said expression comprising a user-executed indication of a first subset of said collection, said user-executed indication having been received as input from an information appliance interface to the search engine;
    returning to said user-executable search engine an analysis output including one or more second query expressions each indicating subsets of documents of the first subset that also fulfill the second query expression, said analysis output being output to said information appliance interface;
    receiving from the user-executable search engine a second user-executed indication as an analysis indicator of an analysis to be performed on the first subset, wherein the second user-executed indication comprises a selection of at least one of said one or more second query expressions received as further input from said information appliance interface to the search engine;
    reading said analysis indicator of said analysis to be performed on said first subset; and
    generating an analysis output by performing said analysis on said first subset.

2. The method of claim 1 wherein said query expression comprises one or more name/value pairs.

3. The method of claim 1 wherein said query expression further comprises one or more name/value pairs combined with one or more operators.

4. The method of claim 3 wherein said operators comprise standard boolean operators, statistical operators such as match N of M, and threshold expressions allowing different weighting for different parts of an expression.

5. The method of claim 1 wherein said query expression further comprises one or more indications of linguistic tools.

6. The method of claim 1 further comprising reading one or more parameters after said analysis indicator, said one or more parameters specifying modification of said analysis.

7. The method of claim 1 further comprising: reading a redirection indicator indicating that said analysis results are to be evaluated as queries to a document set.

8. The method of claim 1 further comprising: determining if said first subset contains sufficient data; and if not, modifying said query using a fallback procedure to generate a larger first subset.

9. The method of claim 7 further comprising: reading a further query expression outside of said redirection indicator and combining said further query expression with one or more query expressions output by said analysis.

10. The method of claim 1 further comprising: reading an analysis parameter indicating a desired number of second query expressions to be returned by said analysis.

11. The method of claim 1 wherein said analysis further comprises a rollup function that returns indications of N subsets of said first subset, each of said N subsets including documents that contain at least one of the top N most frequent values from an indicated field expression.

12. The method of claim 1 wherein said analysis further comprises a categorize function that returns indications of N subsets of said first subset, each of said N subsets including documents identified by determining patterns of name/value pairs that tend to occur together.

13. The method of claim 1 wherein said analysis further comprises a partition function that returns indications of multiple distinct subsets of said first subset.

14. The method of claim 1 wherein said analysis further comprises a compare function that returns indications of name/value pairs that most strongly differentiate two document sets.

15. A method allowing a user to succinctly express complex data selections from a document collection comprising:
   providing a suite of query expression constructors as first output to an information appliance interface to a user-executable search engine for specifying an initial set of documents from a document collection as first input from said information appliance interface to said search engine;
   providing a suite of analysis constructors as second output to an information appliance interface for specifying an analysis to be performed on the document set as second input from said information appliance that comprises an analysis indicator of an analysis to be performed on the set of documents; and
   providing a subquery indicator for specifying that results of an analysis constructor expression should be evaluated as a query, with a document set indication returned that comprises a subset of the initial document set.

16. The method of claim 15 wherein the output of an analysis can be expressed using said query expression constructors.

17. The method of claim 15 wherein said query expression constructors comprise: a name/value pair constructor; and a set of operators for modifying or combining name/value pairs.

18. The method of claim 17 wherein said query expression constructors further comprise: one ore more indications of linguistic tools.

19. The method of claim 15 wherein said analysis expression constructors comprise: an analysis document set indication; an analysis name indicating one or more of a plurality of possible analysis to be performed on said document set; and one or more parameters after said analysis name, said one or more parameters specifying modification of said analysis.

20. The method of claim 15 wherein said analysis document set indication is expressed using said query expression constructors.

21. A structured document selection system comprising:
   a query processor capable of accepting a query expression as first input from an information appliance interface to a user-executable search engine, and of returning a subset of documents of said document collection as first output to said information appliance interface, said subset matching said query expression; and
   an analysis processor capable of accepting a further document subset as second input from said information appliance interface to said user-executable search engine, and returning one or more further query expressions indicating said further subset as second output to said information appliance interface, wherein said second input comprises a selection of at least one of said one or more further query expressions.

22. The system of claim 21 wherein: said returned subset of documents are returned with a score indicating the degree of matching to said query expression.

23. The system of claim 21 wherein: said one or more query expressions indicating said subset are returned in an order indicating a relative number of documents selected by each said query expression.

24. The system of claim 21 wherein: said one or more query expressions indicating said subset are returned along with a weighting parameter indicating a relative number of documents selected by each said query expression.

25. A system selecting documents of interest comprising:
   a document collection;
   a query engine component that, in response to a first query expression received as first input from an information appliance interface to a user-executable search engine, searches said document collection to identify a set of documents that match the query expression; and
   a document set analysis component that, upon submission of said set of documents, outputs as first output to said information appliance interface one or more second query expressions reflecting an analysis of said set;
   wherein said query engine component and said set analysis component are linked so that a document set output identified by said query engine component can be directly input to said analysis component, and
   wherein one or more document subsets each expressed as a second query expression are provided as user-selectable second output to said information appliance interface.

26. The system of claim 25 wherein said document collection is a collection of structured documents.

27. The system of claim 25 wherein said query engine component evaluates queries expressed as one or more name/value pairs.

28. The system of claim 25 wherein said analysis component can perform a plurality of different analyses, indicated by an analysis indicator.

29. An electronic data file, recorded on a digital medium, that when loaded into an appropriately configured digital apparatus causes the apparatus to operate in accordance with the method of claim 1.

30. An electronic data file, recorded on a digital medium, that when loaded into an appropriately configured digital apparatus causes the apparatus to embody the system of claim 22.

31. A method of presenting items available to a user comprising:
   accepting a search criteria from a user, including criteria indicating one or more of a plurality of possible analysis;
   performing a query derived from said search criteria against a first data set to generate a first results set;
   analyzing said first results set using an indicated analysis to generate one or more query expressions from said first results set; and
   presenting indications of said one or more query expressions for user selection, and
   providing a subset of content of said first results set based on said user selection.

32. The method of claim 31 further comprising: determining if said first result set contains sufficient results; and if not, using said generated one or more query expressions to generate a larger result set.

33. A method for searching a database of records, comprising:
   searching the database, in response to a search instruction received as a first input from an information appliance interface to a user-exectuable search engine, to generate a search result list as first output to said information appliance interface which includes a selected set of the records;

processing at least a portion of the search result list received as second input from said information appliance interface to (i) perform an analysis on records within the search result list, (ii) identify one or more queries indicating record sets in the search result list and (iii) provide as second output to said information appliance interface said one or more identified queries, each query being representative of subset of said search result list.

34. A method according to claim 33 further comprising ranking the records within the search results list according to a scoring metric.

35. A method according to claim 33 wherein the database includes Internet records.

36. A search apparatus for searching a database of records, comprising a search processor, responsive to a search instruction received as a first input from an information appliance interface to a user-exectuable search engine, for searching the database to generate a search result list which includes a selected set of the records;

an analysis processor for processing at least a portion of the search result list to dynamically (i) perform an analysis on records within the search result list, (ii) identify one or more queries indicating record sets as first output to the information appliance interface, (iii) receive from the user-executable search engine a second input to the information appliance interface as an analysis indicator of an analysis to be performed on the first subset, and (iv) output said one or more identified queries to the search engine as second output to the information appliance interface.

37. An apparatus according to claim 36 further comprising means for ranking the records within the search result list according to a scoring metric.

* * * * *

UNITED STATES PATENT AND TRADEMARK OFFICE
CERTIFICATE OF CORRECTION

| | | |
|---|---|---|
| PATENT NO. | : 7,346,608 B2 | Page 1 of 1 |
| APPLICATION NO. | : 10/946328 | |
| DATED | : March 18, 2008 | |
| INVENTOR(S) | : Annau et al. | |

It is certified that error appears in the above-identified patent and that said Letters Patent is hereby corrected as shown below:

On Title page, in Item 56, in column 2, under "Other Publications", line 2, delete ".gm-u,edu/" and insert -- .gmu.edu/ --, therefor.

In column 4, line 21, delete "topic.Alaska," and insert -- topic:Alaska, --, therefor.

In column 5, line 34, delete "2° F." and insert -- 2 OF --, therefor.

In column 6, line 33, delete "a of" and insert -- of --, therefor.

In column 7, line 26, delete "product:patio_furniture)" and insert -- product: "patio furniture") --, therefor.

In column 10, line 7, delete "and or" and insert -- and/or --, therefor.

In column 11, line 21, after "expression" insert -- : --.

In column 13, line 65, delete "the are" and insert -- the art --, therefor.

In column 19, line 30, after "promotion," delete "¤" and insert -- * --, therefor.

In column 19, line 37, delete "¤ as" and insert -- * as --, therefor.

In column 20, line 12, delete "a ¤" and insert -- a * --, therefor.

In column 23, line 37, in claim 18, delete "ore" and insert -- or --, therefor.

In column 24, line 67, in claim 33, delete "user-exectuable" and insert -- user-executable --, therefor.

In column 26, line 1, in claim 36, delete "user-exectuable" and insert -- user-executable --, therefor.

Signed and Sealed this

Twenty-third Day of March, 2010

David J. Kappos
*Director of the United States Patent and Trademark Office*